March 27, 1956 D. T. DOBROGOWSKI ET AL 2,739,817

ESCAPEMENT MECHANISM FOR RECORD PLAYERS

Filed June 18, 1951

Inventor
DANIEL T. DOBROGOWSKI
RALPH M. ROEN
ROBERT H. JONES

By Wheeler, Wheeler & Wheeler
Attorneys

United States Patent Office 2,739,817

Patented Mar. 27, 1956

2,739,817

ESCAPEMENT MECHANISM FOR RECORD PLAYERS

Daniel T. Dobrogowski, Milwaukee, Ralph M. Roen, Greenfield, and Robert H. Jones, West Allis, Wis., assignors to Milwaukee Stamping Company, Milwaukee, Wis., a corporation of Wisconsin Application June 18, 1951, Serial No. 232,094

9 Claims. (Cl. 274—10)

This invention relates to an escapement mechanism for delivering individual phonograph records onto a phonograph turntable from a spindle supported stack of such records.

The invention contemplates an ejector dog which floats in a slot of the spindle and is subject to the bias of two separate springs, one of which acts upwardly on the dog and the other of which tends to oscillate it. A camming actuator moves the dog pivotally in opposition to the last mentioned spring to eject from the stack the record to be played. The remaining records thereupon force the dog downwardly against the bias of the first mentioned spring until the lowermost record of the remaining stack is again supported by a shoulder of the spindle. This compresses the first mentioned spring. Consequently, upon withdrawal of the actuator, the second spring oscillates the dog back into registry with the record apertures and the first spring thereupon raises the dog to its original position. Thus, the actuator effects only a pivotal movement of the dog, its upward movement being effected by the vertically acting spring.

The invention further contemplates an arrangement whereby the vertically acting spring is confined in an opening in the ejector dog, between a portion of the dog and a transverse pin which passes through such opening. The spring which biases the pivotal movement of the dog is disposed in a channel of the dog but anchored in a pair of proximate openings of the spindle, which are counterbored so that no portion of the spring projects externally of the spindle.

Figure 1:
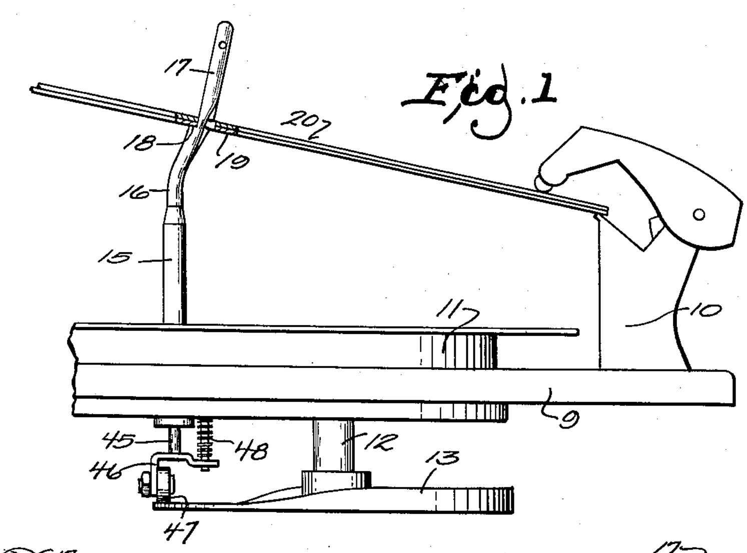
Fig. 1 is a fragmentary view in side elevation of portions of the mounting plate turntable, record supporting pedestal and spindle of an automatic phonograph or record player embodying the invention.

The present invention is concerned only with the escapement mechanism. The mounting board 9, pedestal 10, turntable 11, driving shaft 12, and cam 13 may be of any suitable construction. The spindle 15, which is mounted coaxially with turntable 11, has at its upper end a somewhat reduced extension 16, which is inclined laterally and leads to an upper terminal portion 17 which is offset from portion 16 to provide a shoulder at 18 upon which may rest the lowermost record 19 of the stack generically designated by reference character 20. At its free margin, the lowermost record rests on the pedestal 10 in the usual way. When the lowermost record is moved laterally to free it from shoulder 18, it is also freed from pedestal 10 and falls downwardly onto the turntable guided by portions 15 and 16 of the spindle.

Each record is provided with a central aperture at 21 to permit its being threaded onto the upper extremity 17 of the spindle in the usual way. The spindle has a downwardly exposed shoulder at 22, which is spaced above shoulder 18 by a distance slightly exceeding the distance of one record so that the remaining records of the stack will remain fixed against lateral displacement when the lowermost record 19 is being dislodged by the escapement dog hereinafter to be described. In the particular device disclosed, the downwardly facing shoulder 22 is provided by a pawl 23 which, in the position shown in the drawings, projects at its lower end from spindle extremity 17, but which may, in a known manner, recede into the spindle if moved upwardly in its slot 24. For the purposes of the present invention, it is broadly immaterial whether the shoulder 22 is thus provided in a yieldable pawl or whether it comprises a fixed part of the spindle.

The spindle portion lying beneath shoulder 18 is provided in a vertical plane with a slot 25 transversely spanned by a pin 26. In the offset portion 16 of the spindle this slot is desirably widened to open at both sides of the spindle. At a lower level, as indicated in Figs. 2 to 6, the slot opens only to the right hand side of the spindle, as viewed in these figures.

Figures 2, 7:
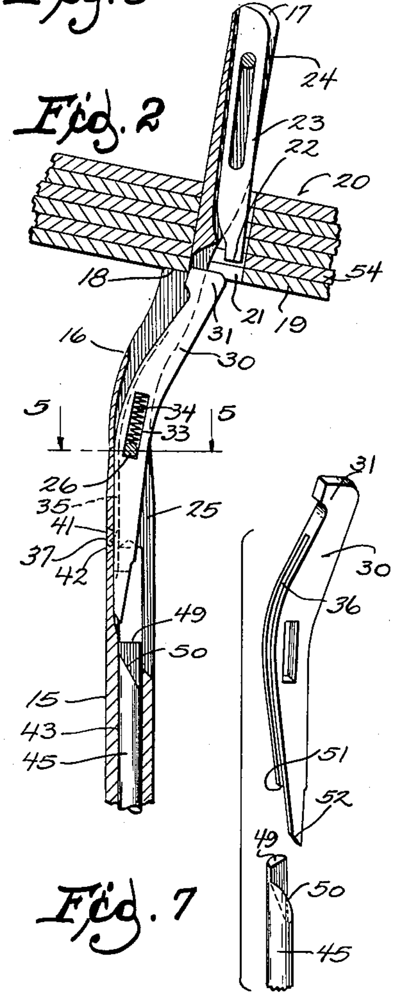
Fig. 2 is an enlarged detail view in axial section through the spindle and portions of a stack of records to be played.
Fig. 7 is a view in perspective showing details of the dog and the upper end of its actuator.

Floating in the slot 25 is the ejector dog 30, which curves more abrutly to the right than does the inclined portion 16 of the spindle so that the upper headed end 31 of the dog normally projects laterally from slot 25 to register with spindle extremity 17, as best shown in Fig. 2. The dog is transversely pierced at 33 to pass the transverse pin 26. Confined within the opening 33, and bearing upon the pin, is a relatively light compression spring 34 which normally biases the dog 30 to the elevated position in which it is shown in Fig. 2, wherein the headed upper end 31 of the dog lies within the aperture 21 of the lowermost record 19.

Figures 5, 6:
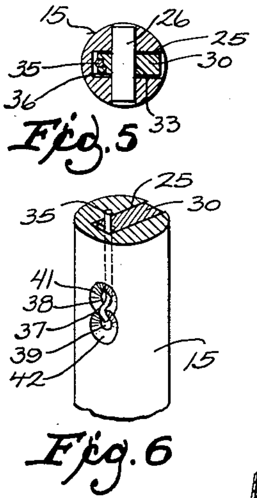
Fig. 5 is a detail view taken on an enlarged scale on the section indicated at 5—5 in Fig. 2.
Fig. 6 is an enlarged fragmentary perspective view showing portions of the spindle and one of the dog biasing springs.

The dog is biased for oscillation clockwise about pin 26, as viewed in Figs. 2 to 6, by means of the piano wire spring 35 which lies within a groove 36 in the convex side of the dog, as is best shown in Figs. 5 and 7. At its lower end, the piano wire spring 35 has a hooked portion 37 which passes upwardly through a portion of the spindle wall by means of aperture 38 and returns inwardly in aperture 39. The hook portion 37 of the spring is housed within the projected diameter of the circular spindle by counterboring both of the apertures 38 and 39 at 41 and 42 respectively.

The lower end of the spindle has an axial bore 43 within which the actuator rod 45 is reciprocable. A fitting 46, at the lower end of the rod, carries a cam follower roller 47 riding on the cam 13 to be elevated and thereby to thrust rod 45 upwardly whenever cam 13 is rotated by means of its drive shaft 12. The means for rotating such a drive shaft and cam, incident to the completion of reproduction of one record and the movement of another into playing position, is well known and forms no part of the present invention. For urging the fitting 46 and the actuator rod 45 downwardly, subject to control by cam 13, a compression spring is provided at 48.

At its upper end, the rod 45 is provided with a terminal shoulder at 49 and a bevelled surface at 50, the shoulder lying at one side of its center line and the bevelled surface at the other, as will clearly appear from Figs. 2 to 4 and 7. The ejector dog 30 has complementary surfaces at 51 and 52, respectively. In the normal position of the parts shown in Fig. 2, the actuator is completely out of contact with the complementary surfaces at the lower end of the dog.

The operation is as follows: The rotation of the control cam 13 raises the actuator rod 45 until its inclined cam surface 50 engages the complementary surface 52 of the dog. The dog is, at this time, in its maximum elevated position as determined by engagement of the cross pin 26 with the dog at the lower end of slot 33. The headed upper end 31 of the dog 30 lies within the aperture 21 of the lowermost record 19 of stack 20. This record, supporting those above it, rests upon the shoulder 18 of the spindle.

The continued rise of actuator 45 causes the oscillation of dog 30 upon the cross pin 26 as a fulcrum, such oscillation resulting from the camming action of the bevelled surface 50 on the complementary surface 52 of the dog. This oscillation is opposed by the bias of the piano wire spring 35 which, however, is overcome by the superior pressure exerted by actuator 45.

Figures 3, 4:
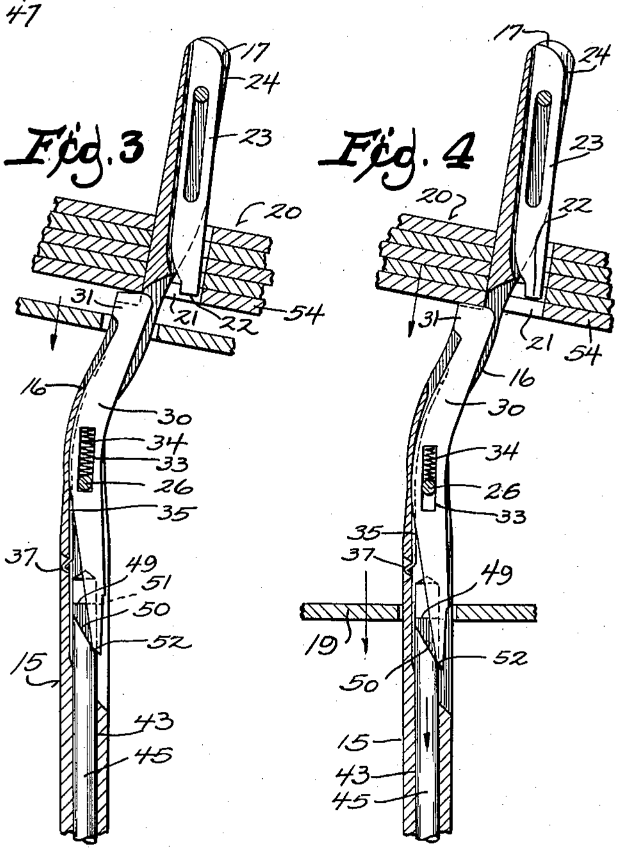
Fig. 3 is a view similar to Fig. 2, showing the parts in the relative position they assume when the lowermost record of the stack is being ejected.
Fig. 4 is a view similar to Figs. 2 and 3, showing a subsequent position of the parts.

As the dog oscillates, its head 31 engages the lowermost record 19 at the left hand side of the record aperture 21, as viewed in Figs. 2 and 3, thereby displacing such record laterally until its central portion is disengaged from shoulder 18 and its marginal portion from the standard 10. Meantime, the remaining records of stack 20 are held against lateral displacement through contact with the side of the pawl 23.

As the record 19 falls down the spindle, in the manner shown in Fig. 3, toward the playing position on turntable 11, the weight of the remaining records of the stack is transferred to the head 31 of pawl 30. At this point, the pawl cannot yield downwardly because its transverse shoulder 51 rests upon the complementary shoulder 49 of the actuating rod 45.

During the continued rotation of the controlling cam 13, the rod 45 is lowered again toward the position in which it is shown in Figs. 1 and 2. As it is lowered, the dog 30 moves downwardly with it, provided the dog carries a substantial load of records, thereby lowering record stack 20 gradually toward the spindle shoulder 18, upon which the now-lowermost record 54 of such stack is deposited without shock, as shown in Fig. 4. Spring 34 has been compressed by the downward movement of dog 30, the weight of the stack of records being greater than the bias of spring 34.

With a single seven inch record, or even two such records of some makes, the weight will be insufficient to compress spring 34, in which case the rod 45 will simply move away from dog 30, leaving the records supported by such dog until dropped onto shoulder 18 by the retraction of the dog through the action of spring 35, no cushioning being necessary where the record load is so light.

Assuming the record load to be substantial, the continued downward movement of the actuator 45 from the position of Fig. 4 toward that of Fig. 2, will ultimately remove the actuator from contact with the dog in the manner indicated in Fig. 2. The dog, having already been relieved of the weight of the stack of records by reason of the transfer of such weight to the spindle shoulder 18, the disengagement of the dog by the actuator leaves the dog free for oscillation clockwise about pin 26 under the bias of the piano wire spring 35 until the headed upper end 31 of the dog is no longer engaged with the record 54 but registers with the aperture 21 thereof. As soon as such registration is effected, the spring 34 can act to lift the dog back to the original position in which the dog is shown in Fig. 2, the dog now being within the aperture of the next successive record in readiness to displace that record pursuant to a repetition of the escapement sequence as above described.

We claim:

1. The combination with a shouldered spindle, of a dog pivotally and axially movable respecting the spindle, the dog and spindle having complementary surfaces in bearing engagement for guiding the dog for such movements, spring means biasing the dog laterally and upwardly respecting the spindle, the dog normally projecting above the spindle shoulder and lying at one side thereof to be received into the aperture of a record resting on such shoulder, and an actuator mounted for movement longitudinally of the spindle, the said dog and actuator having bevelled surfaces adapted to be engaged in the reciprocation of said actuator to oscillate said dog in the elevated position of the dog in a direction to move the upper end of the dog across said shoulder for the displacement of a record previously supported thereon, said dog and actuator having transverse shouldered portions apart from said bevelled surfaces mutually engageable in the elevated position of the actuator in the event that the dog is urged downwardly against the bias of said spring means by the weight of a record superposed on the upper end of the dog in consequence of the displacement of the aforesaid record from said spindle shoulder for the positive support of said record by said actuator, and means for retracting the actuator to lower said dog and superposed record into engagement with said spindle shoulder and for continuing the retraction of said actuator to free said dog for pivotal movement into registry with the aperture of the record newly deposited on the spindle shoulder and for upward movement into such aperture in response to the bias of its said spring means.

2. The device of claim 1 in which the said spring means comprises an upwardly acting spring and a laterally acting spring.

3. The device of claim 2 in further combination with a pin transverse to the spindle axis, said dog being pierced transversely with an opening in which the upwardly acting spring is disposed and through which the pin connected with the spindle extends, the pin comprising a seat for said spring and a guide for said dog.

4. The device of claim 2 in which the laterally acting spring comprises an elongated piano wire spring connected at its lower end with the spindle said dog being provided with a longitudinally extending groove within which said piano wire spring is disposed, the said spindle having a pin and the dog having an aperture through which the pin extends for the pivoting of the dog respecting the spindle, the free end of the last mentioned spring acting laterally upon the dog above said pin.

5. The device of claim 4 in which the dog is provided with an opening sufficiently elongated above the pin to receive the upwardly acting spring aforesaid, said upwardly acting spring comprising a coil spring for which said pin provides a seat.

6. A phonograph spindle of tubular form at its lower end and provided with an intermediate inclined portion terminating in a shoulder and with an upper extremity offset at said shoulder, said spindle having a slot opening laterally above its tubular portion and communicating therewith and extending above said shoulder, a pin carried by said spindle and extending transversely across the slot, a compression spring seated upon said pin, an ejector dog pivotally and slidably guided in the slot of the spindle and provided with an opening through which said pin extends and in which said compression spring is disposed, said dog having a laterally inclined portion above the pin normally projecting from said slot at the side thereof opposite the spindle shoulder, said dog further having a head portion normally elevated by said compression spring to a point above the level of said shoulder, the dog being freely movable against the bias of said spring downwardly along said spindle to a position below said spindle shoulder, a spring wire extending upwardly within the spindle and having a portion engaged with the dog above the pin and biasing the dog laterally for oscillation about the pin, a portion of the dog below the pin engaging the spindle to limit such oscillation to a position in which the dog head lies immediately behind the shoulder and in substantial registry with the offset spindle extremity, means connecting said spring at its lower end to the spindle, and an actuator reciprocable in the tubular spindle, the actuator and said dog haviug complementary bevelled surfaces normally spaced and engaged in the advance of the actuator for the oscillation of the dog upon said pin and against the bias of the spring wire in a direction to move the dog head across said shoulder, said dog and actuator being additionally provided with normally disengaged transverse shoulders apart from said bevelled surfaces and engageable when the dog is forced downwardly against the bias of said compression spring and the actuator is in an advanced position, the engagement of the dog and actuator shoulders providing positive actutor support for the lowering of the dog against the bias of said compression spring, the bevelled surfaces of the actuator and dog lying at one side thereof and the respective shoulders aforesaid at the other.

7. The device of claim 6 in which the means for anchoring the spring wire comprises a pair of proximate holes with which the spindle is provided and extending from the slot of the spindle through a side wall thereof, the spring wire having its lower end extending outwardly to one of said holes and inwardly to the other, the external surface of the spindle being relieved to accommodate said wire within the projected spindle diameter.

8. The device of claim 7 in which the dog has a groove in which said wire is housed within the spindle.

9. A release mechanism for centrally apertured records and comprising a hollow tubular spindle having a ledge and a stem offset from the ledge to receive centrally apertured records threaded on the stem, an ejector dog movable in the hollow spindle, said spindle being provided with a transverse pin and the dog being provided with a slot in which the pin is disposed to slidably guide the dog for movement pivotally and reciprocably respecting the pin, an actuator within the spindle, said dog and actuator being provided with bevelled cam surfaces which engage on relative movement of the actuator toward the dog for pivoting the dog about the pin and with transverse abutting shoulders which come into engagement upon completion of camming action of said cam surfaces whereby said cam action will eject the lowermost record supported on said ledge and said abutting surfaces will directly support records descending into supported engagement with the dog after the lowermost record has been ejected, said dog being provided with a spring normally biasing the dog to the upward limit on its movement respecting the ledge and at which limit its head extends into the central aperture of the lowermost record, said spring being yieldable upon relative movement of the actuator away from the dog to permit the dog to follow the actuator until the record supported by the dog comes into support relationship with the ledge, and a second spring biasing a portion of said dog offset from the pin in a lateral direction to return the dog from the position to which it was first pivotally moved upon continued withdrawal of the actuator to release said cam surfaces from engagement.

References Cited in the file of this patent

UNITED STATES PATENTS

| | | |
|---|---|---|
| 2,368,086 | Becwar | Jan. 30, 1945 |
| 2,523,045 | Miller et al. | Sept. 19, 1950 |
| 2,621,932 | Knox | Dec. 16, 1952 |
| 2,634,983 | Dale | Apr. 14, 1953 |

FOREIGN PATENTS

| | | |
|---|---|---|
| 68,487 | Norway | Oct. 23, 1944 |